Jan. 31, 1967  W. A. JENNINGS  3,301,517
MULTIPLE FRICTION COLLAR ASSEMBLY
Filed June 3, 1965  2 Sheets-Sheet 1
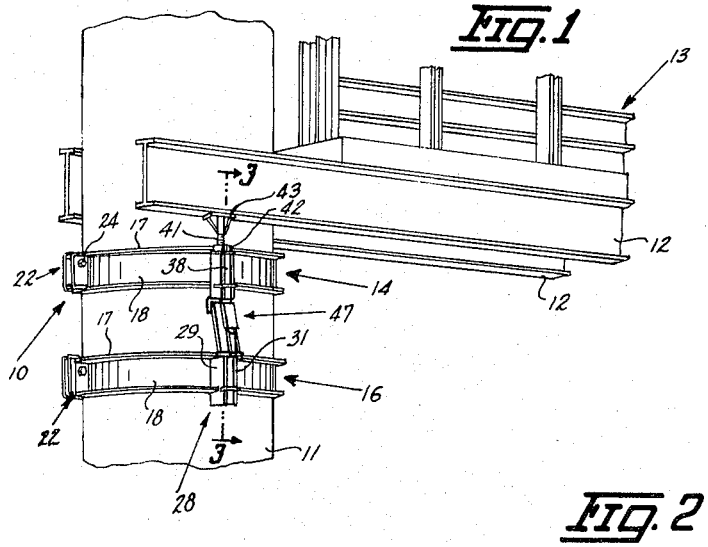
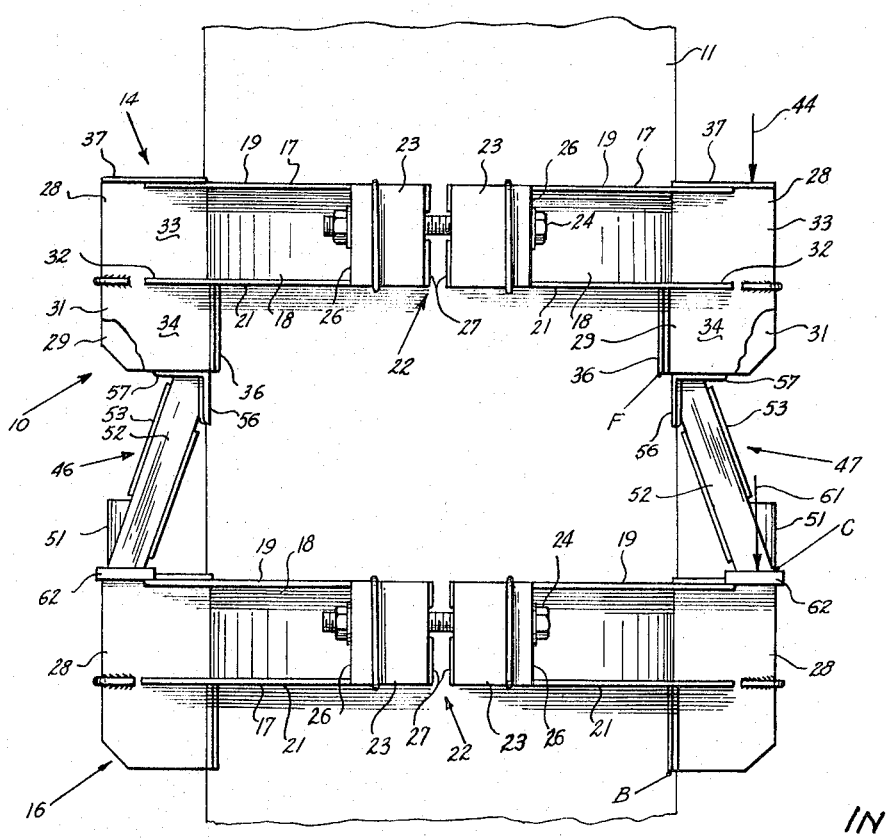
INVENTOR.
WILLIAM A. JENNINGS
BY
ATTORNEY.

Jan. 31, 1967 W. A. JENNINGS 3,301,517
MULTIPLE FRICTION COLLAR ASSEMBLY
Filed June 3, 1965 2 Sheets-Sheet 2
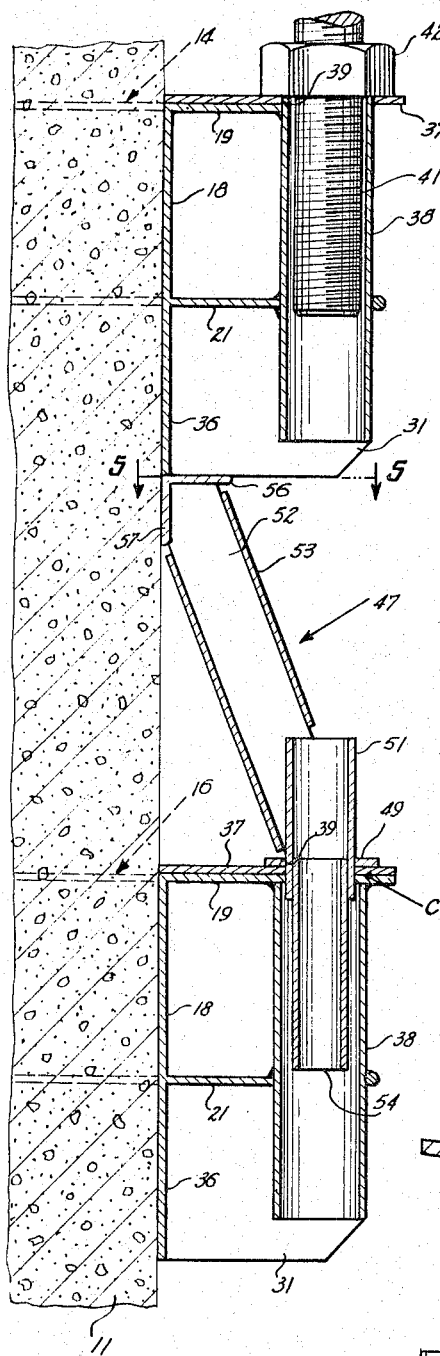
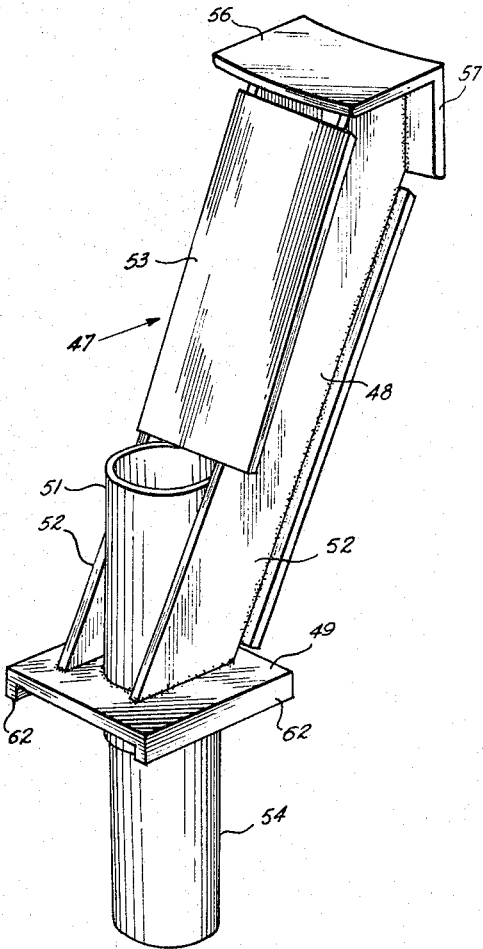
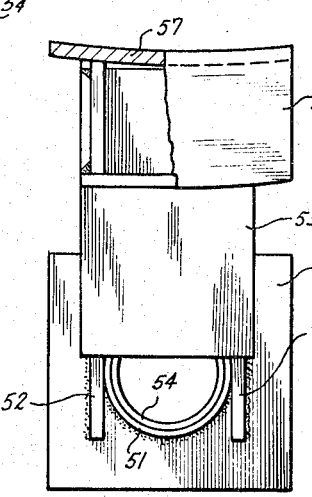
INVENTOR.
WILLIAM A. JENNINGS
*Rudolph L. Lowell*
ATTORNEY.

3,301,517
MULTIPLE FRICTION COLLAR ASSEMBLY
William A. Jennings, Des Moines, Iowa, assignor to Economy Forms Corporation, Des Moines, Iowa, a corporation of Iowa
Filed June 3, 1965, Ser. No. 461,021
5 Claims. (Cl. 248—221)

This invention relates generally to column mounted load carrying supports and in particular to a multiple friction collar assembly for supporting concrete forms which is mountable about a column to distribute thereover a load applied directly only on the upper friction collar of the assembly.

An object of this invention is to provide a multiple friction collar load carrying assembly in which the load is distributed for support on all of the friction collars in the assembly.

A further object of this invention is to provide a multiple friction collar assembly wherein each friction collar may be of an identical construction adapted to alone support a predetermined maximum load and releasably connectable through a load transfer member with a second friction collar to support therewith a load that is substantially equal to twice such predetermined maximum load.

A further object of this invention is to provide a multiple friction collar assembly comprised of like constructed friction collars which can be used singly or coupled together in multiples so as to accommodate a wide range of load carrying requirements.

Still another object of this invention is to provide a multiple friction collar assembly comprised of like constructed friction collars adapted to be releasably connected through load transfer members to handle a wide range of load requirements whereby to eliminate the need and expense of maintaining specific size friction collars to handle specific loads.

Further objects, features and advantages of this invention will become apparent from the following description when taken in connection with the accompanying drawing, in which:

FIG. 1 is a foreshortened fragmentary perspective view showing a concrete form structure supported from a multiple friction collar assembly of this invention;

FIG. 2 is a side elevational view of the multiple friction collar assembly shown in mounted position about a column;

FIG. 3 is an enlarged sectional detail view as seen along the line 3—3 in FIG. 1 with parts broken away for clarity;

FIG. 4 is an enlarged perspective view of a load transfer member which forms part of the multiple friction collar assembly of this invention; and FIG. 5 is an enlarged detail view taken along the line 5—5 in FIG. 3 with parts broken away.

Referring to FIG. 1 of the drawing there is shown a multiple friction collar assembly of this invention, designated generally at 10, in mounted position about a cylindrical concrete column 11. Structural beams 12 are extended between pairs of mounted assemblies 10 (only one of which is shown) to carry a concrete form structure 13.

As shown in FIGS. 1 and 2 the multiple friction collar assembly 10 includes a pair of similar collar units 14 and 16 only one of which will be referred to in detail and with like parts in the collar units 14 and 16 being indicated by like numbers.

The collar unit 14 is comprised of a separable ring structure which is formed of a pair of like half-sections or semicircular ring members 17. The ring structure is of a generally channel or C-shape in transverse section so that each ring section 17 has an upright inner bearing wall 18 formed with a curvature substantially equal to the curvature of the column 11 on which the collar assembly 10 is to be mounted. Secured to and extended laterally outwardly from the upper and lower edges of the bearing wall 18 are flanges 19 and 21, respectively.

The collar unit 14 is described in co-pending application Serial No. 439,652 filed March 15, 1965 and has the half-ring sections 17 connected together by a pair of like coupling units, indicated generally as 22, for connecting together corresponding adjacent ends of the sections 17 (FIG. 2). Each coupling unit 22 includes a pair of box structures 23 and a connecting bolt 24. A box structure 23 is located at each end of a half-ring section 17 and has a pair of end walls 26 and 27 formed with aligned openings (not shown) to receive the bolt 24 at a position adjacent the upper flange 19. With the half-ring sections 17 positioned about a column 11 and the bolt 24 connected to adjacent box structures 23, in bearing engagement with the end walls 26, a tightening of the bolt 24 couples together the half-ring sections 17. This coupling action draws the bearings walls 18 into clamped frictional engagement with the peripheral surface of the column 11.

Each half-ring section 17 is provided intermediate its ends with a radially extended load supporting means 28 (FIG. 2) which includes a pair of oppositely spaced side wall members 29 and 31 of a generally rectangular shape. The wall members 29 and 31 are notched at 32 so that the upper portion 33 of each side wall fits within an area defined by the flanges 19 and 21 and the bearing wall 18 and the lower portion 34 of each side wall 29 and 31 projects downwardly below the lower flange 21.

Extended across and connected by welding to the inner ends of the lower wall portions 34 of the side walls 29 and 31 is a downward extension 36 of the bearing member 18 of a half-ring section 17. The upper ends of the side walls 29 and 31 are recessed to receive the upper flange 19. A top plate 37 is secured, as by welding, to a top surface portion of the upper flange 19 and to the upper edges of the walls 29 and 31.

A screw receiving tube 38 is projected through a hole 39 formed in the top plate 37 (FIG. 3) at a position between the walls 29 and 31 and outwardly of the flanges 19 and 21. An upright screw 41 receivable within the tube 38 is operatively associated with a nut 42 that is in bearing engagement with the top plate 37. The upper end of the screw 41 (FIG. 1) terminates in a horizontal platform 43 on which the load carrying beams 12 are supported. On adjustment of the nut 42 the platform 43 is lowered or raised to adjust the beams 12 to a desired position.

Form structures, such as 13, which are to be carried by the multiple collar assemblies 10 vary widely in weight. To accommodate these weight variations the practice heretofore has been to provide a friction collar designed to carry a given load requirement relative to the diameter of the supporting column. This practice necessitated having available either a plurality of heavy load carrying collars or a plurality of collars having different load carrying capacities. Either of these alternatives resulted in unnecessary expense and excess handling of equipment along with the inconvenience encountered in the storage of an insufficient number of the proper size collar units required for a particular job.

These disadvantages are eliminated by the multiple frictional collar assembly 10 of this invention wherein the similar collar units 14 and 16 are designed to be separately capable of supporting a given load and, when coupled together, capable of supporting twice the given load or even a greater load should the use of additional collar units be desired.

The ability of a friction collar 14 and 16 to support a load against appreciable slippage relative to the column 11 is dependent essentially on the function of the coupling unit 22 to maintain the inner peripheral surface of the bearing walls 18 and bearing portions 36 in maximum frictional engagement with the peripheral surface of a column 11. In this connection it is to be noted that the load acting on the platform 43 tends to move the upper peripheral portion of the bearing member 18 away from the peripheral surface of the column 11 concurrently with forcing the lower peripheral portion of the bearing member against the column.

In other words and with reference to FIG. 2 the applied load indicated by the arrow 44 effects a turning moment of the load support 28 tending to rotate the load support 28 about a fulcrum zone indicated at F. This turning moment acts to increase the frictional engagement between the bearing wall 18 and bearing portion 36 with the column 11 so that the applied load is utilized to increase the efficiency of the frictional grip between the friction collar and the column. In the use of the collar 16, to complement the holding action of the collar 14 so as to efficiently support a load substantially greater than the load designed for the collar 14, it is necessary that the efficiency of the frictional grip of the collar 14 be maintained while providing for a like efficient frictional grip of the collar 16 with the column 11. Such a complementary distribution of the applied load between the collar units 14 and 16 is accomplished by coupling or load transfer units 46 and 47.

These load transfer units 46 and 47 are identical in construction and use so only the unit 47 will be described in detail with like numbers being applied to corresponding parts. The load transfer unit 47 (FIGS. 4 and 5) includes an elongated tubular body member 48 of a generally square shape in transverse cross section. The body member 48 has its lower end secured as by welding to a flat supporting plate 49 at a position inclined relative to the plane of the plate 49 and to a pipe member 51 extended through and secured to the plate 49 with its axis normal to the plane of the plate 49. As best appears in FIG. 4 the side walls 52 of the body member 48 are arranged in a straddling relation with the pipe 51 and with the side wall 53 being cut away to provide for such relation.

Inserted within the lower end of the pipe 51 and secured thereto by welding is a second pipe member 54 which constitutes an extension of reduced diameter relative to the pipe 51. The upper ends of the wall members 52 are formed to receive thereon an angle member having a horizontal leg portion 56 lying in a plane parallel to the plane of the plate member 49 and an upright leg 57 curved longitudinally to fit the curvature of the peripheral surface of the column 11.

In use and as shown in FIG. 3 the transfer member 47 is positioned between the collar units 14 and 16 with a tube 51 positioned in the opening 39 of the plate 37 so that the extension 54 is received in a concentrically spaced relation within the sleeve 38. The upper end of the transfer member 47 is arranged in what might be called a nested relation with the column 11 and the lower end of the load support 28. In other words the upright leg or bearing portion 57 is in engagement with the peripheral surface of the column 11 and the horizontal leg or bearing portion 56 is in engagement with the lower edges of the side walls 29 and 31 and bearing wall extension 36. This assembly is facilitated by the provision on the plate 49 of downwardly extended guides 62 (FIG. 4) for engaging opposite sides of the top plate 37 of the load support 28.

As perviously described in connection with FIG. 2 the applied load 44 tends to rotate the load support 28 about a fulcrum F. By virtue of the arrangement of the transfer member 47 between the collar units 14 and 16 and in a position inclined downwardly and upwardly from the peripheral surface of the column 11 toward the outer end of the support unit 28 of the collar unit 16 the excess load applied to the collar 14 is transmitted or distributed to the transfer member 47. The excess load transmitted by the member 47 on the collar 16 is applied at a position indicated by the arrow 61 so that the vertical component of the load 61 acts in all respects on the load support 28 of the collar 16 as the load 44 relative to the collar 14.

In other words the load applied at 61 creates a turning moment acting to rotate the load support 28 of the collar 16 about a fulcrum indicated at B. A maximum frictional grip between the collar units 14 and 16 and the column 11 is thus obtained. In this respect it is apparent that if the transfer member 47 were extended vertically between vertically opposite load supports 28 that the turning moment of the load support 28 of the friction collar 14 would be prevented so as to appreciably decrease the load supporting efficiency of the collar 14.

It will also be seen that by virtue of the reduced pipe extension 54 any tendency of the load imposed on a transfer member 47 by the collar unit 14 and tending to rotate the transfer member 47 about a fulcrum indicated at C is permitted (FIG. 3). If this relative movement was completely inhibited, as by rigidly securing the transfer member 47 to the collar unit 16, the transmitted load would tend to move the bearing wall 18 away from the column 11 instead of acting to maintain frictional engagement between the column and the bearing wall.

Although the invention has been described with respect to a preferred embodiment thereof it is to be understood that it is not to be so limited since changes and modifications can be made therein which are within the full intended scope of this invention as defined by the appended claims.

I claim:

1. A multiple friction collar assembly for mounting about an upright cylindrical column comprising:
   (a) a pair of collar units mountable in a vertically spaced relation about the column with the inner peripheral surfaces thereof in frictional engagement with the outer peripheral surface of said column,
   (b) each collar unit including a pair of diametrically opposite load supporting portions, with the load supporting portions on one collar unit arranged vertically opposite the load supporting portions on the other collar unit, and
   (c) a pair of load transfer members corresponding to each pair of vertically opposite load supporting portions, each transfer member positioned between a pair of corresponding vertically opposite load supporting portions in abutting engagement therewith and inclined downwardly and outwardly from the outer peripheral surface of said column with the lower end thereof adjacent the outer end of a lower load supporting portion.

2. A friction collar assembly for mounting about an upright cylindrical column comprising:
   (a) a pair of collar units each of which includes an annular bearing wall mounted about said column in frictional engagement with the outer peripheral surface of the column and a pair of diametrically opposite load supporting portions connected to and extended radially outwardly from said annular bearing wall,
   (b) said collar units vertically spaced on said column with the load supporting portions on one collar unit vertically opposite the load supporting portions on the other collar unit,
   (c) a pair of elongated load transfer members corresponding to each pair of vertically opposite load supporting portions,
   (d) each transfer member positioned between said collar units in abutting engagement with a corresponding pair of vertically opposite load supporting portions and inclined downwardly and outwardly from the peripheral surface of said column, and
(e) coacting means on the lower one of said collar units and on said load transfer members for limiting the movement of the transfer member radially of the lower collar unit.

3. A friction collar assembly for mounting about an upright cylindrical column comprising:
(a) a pair of collar units each of which includes an annular bearing wall mounted about said column in frictional engagement with the outer peripheral surface of the column and a pair of diametrically opposite load supporting portions connected to and extended radially outwardly from said annular bearing wall,
(b) said collar units vertically spaced on said column with the load supporting portions on one collar unit vertically opposite the load supporting portions on the other collar unit,
(c) a pair of elongated load transfer members corresponding to each pair of vertically opposite load supporting portions,
(d) each transfer member extended between a corresponding pair of vertically opposite load supporting portions in a direction inclined downwardly and outwardly from the outer peripheral surface of said column,
(e) bearing portions on the upper end of a load transfer member for abutting engagement with the outer peripheral surface of said column and a corresponding load supporting portion on the upper collar unit and a bearing plate on the lower end of a transfer member for abutting engagement with the corresponding load supporting portion on the lower collar unit, and
(f) coacting means on said load transfer members and on the lower collar unit for limiting the horizontal movement of said bearing plates relative to the lower collar unit.

4. A friction collar assembly for mounting about an upright cylindrical column comprising:
(a) a pair of load supporting collar units mountable in a vertically spaced relation about said column in frictional engagement with the outer peripheral surface thereof, and
(b) means for transferring a load from the upper collar unit to the lower collar unit including an elongated body member located in a vertical plane between and in abutting engagement with said two collar units, with the upper end of said body member in abutting engagement with the lower side of the upper collar unit at the outer peripheral surface of said column, and the lower end of said body member in abutting engagement with the upper portion of said lower collar unit at a position adjacent the outer end of said lower collar unit.

5. A multiple friction collar assembly for mounting about an upright cylindrical column, as defined in claim 1, including:
(a) portions on said collar units projected downwardly below each supporting portion in bearing engagement with the outer peripheral surface of said column.

References Cited by the Examiner
UNITED STATES PATENTS

| 218,883 | 8/1879 | Hopkins | 40—64 |
| 2,705,121 | 3/1955 | Kaminky et al. | 248—230 |

CLAUDE A. LE ROY, *Primary Examiner.*

J. F. FOSS, *Assistant Examiner.*